US011506398B2

(12) United States Patent (10) Patent No.: US 11,506,398 B2
Reischmann et al. (45) Date of Patent: *Nov. 22, 2022

(54) COOKING LIGHT HANDLE

(71) Applicant: Kenyon International, Inc., Clinton, CT (US)

(72) Inventors: Michael Reischmann, Eustis, FL (US); Phillip Williams, Clinton, CT (US)

(73) Assignee: Kenyon International, Inc., Clinton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,827

(22) Filed: Apr. 4, 2022

(65) Prior Publication Data

US 2022/0221159 A1 Jul. 14, 2022

Related U.S. Application Data

(63) Continuation of application No. 17/366,296, filed on Jul. 2, 2021, now Pat. No. 11,326,783.

(60) Provisional application No. 63/047,503, filed on Jul. 2, 2020.

(51) Int. Cl.
*F24C 15/00* (2006.01)
*F21V 21/26* (2006.01)
*F24C 15/02* (2006.01)
*F21W 131/30* (2006.01)

(52) U.S. Cl.
CPC ............ *F24C 15/008* (2013.01); *F21V 21/26* (2013.01); *F24C 15/024* (2013.01); *F21W 2131/30* (2013.01)

(58) Field of Classification Search
CPC ...... F24C 15/008; F24C 15/024; F24C 15/26; F24C 1/16; F24C 3/14; F24C 3/12; F24C 5/20; F24C 5/16; F21V 21/26; F21V 21/28; F21V 33/0044; F21W 2131/30; F21W 2131/307; A47J 36/06; A47J 37/0664; A47J 37/778; F21L 14/00; F24B 1/202
USPC ............ 16/412; 126/30, 39, 37 R, 42, 275 R
See application file for complete search history.

(56) References Cited

U.S. PATENT DOCUMENTS

| 4,449,170 | A | * | 5/1984 | Warshawsky | .......... F16M 11/24 362/450 |
| 4,494,177 | A | * | 1/1985 | Matthews | ............... F21V 21/26 362/402 |
| 4,855,881 | A | * | 8/1989 | Pence | .................... A45C 15/06 362/156 |
| 5,062,029 | A | * | 10/1991 | Engel | ...................... F21V 21/15 362/427 |
| 5,169,226 | A | * | 12/1992 | Friedman | .................. F21S 9/00 362/427 |
| 5,257,169 | A | * | 10/1993 | Walendziak | ........ A47J 37/0786 126/213 |

(Continued)

*Primary Examiner* — Steven B McAllister
*Assistant Examiner* — Daniel E. Namay
(74) *Attorney, Agent, or Firm* — St. Onge Steward Johnston & Reens LLC

(57) ABSTRACT

A combined handle and light source for a cooking appliance such as a grill which is provided with a rotation joint such that the handle can be placed in a stored position to allow for articulation of a lid which covers a cooking surface and such that the handle can be moved relative to the joint to put the handle in a use position to allow the light to illuminate the cooking surface when the lid is in an open position.

20 Claims, 7 Drawing Sheets

(56) References Cited

U.S. PATENT DOCUMENTS

| | | | | |
|---|---|---|---|---|
| 5,685,421 | A * | 11/1997 | Gilmore | A45C 15/06 206/349 |
| 6,132,055 | A * | 10/2000 | Grisamore | A47J 37/0704 362/253 |
| 6,676,278 | B2 * | 1/2004 | Striebel | F21V 23/0442 362/267 |
| 6,935,327 | B1 * | 8/2005 | Williams | A47J 37/0786 126/39 BA |
| 7,008,072 | B2 * | 3/2006 | Witzel | A47J 37/0786 126/213 |
| 7,222,620 | B2 * | 5/2007 | Wolter | F21V 33/008 126/39 BA |
| 7,500,759 | B2 * | 3/2009 | Lin | F21V 17/007 362/198 |
| D652,974 | S * | 1/2012 | Rothman | D26/60 |
| 9,429,283 | B2 | 8/2016 | Pearson et al. | |
| 10,190,734 | B2 | 1/2019 | Pearson et al. | |
| 10,240,763 | B2 * | 3/2019 | Chance | F21V 21/0885 |
| 10,267,463 | B1 | 4/2019 | Pearson et al. | |
| 10,323,802 | B2 * | 6/2019 | Zheng | F21L 4/027 |
| 10,323,834 | B2 * | 6/2019 | Corbo | F21S 4/28 |
| 10,472,028 | B2 * | 11/2019 | Ardoin | F21V 21/14 |
| 10,677,431 | B2 * | 6/2020 | Cacciabeve | F21V 21/29 |
| 10,900,647 | B2 * | 1/2021 | Cacciabeve | F21L 4/04 |
| 2002/0075683 | A1 * | 6/2002 | Striebel | F21V 31/005 362/267 |
| 2004/0228117 | A1 * | 11/2004 | Witzel | F21V 33/008 362/399 |
| 2005/0155597 | A1 * | 7/2005 | Wolter | F21V 33/008 126/25 R |
| 2005/0205077 | A1 * | 9/2005 | Williams | A47J 36/06 126/41 R |
| 2006/0160485 | A1 * | 7/2006 | Brake | F21V 33/008 454/293 |
| 2009/0097235 | A1 * | 4/2009 | Chambers | F41G 1/35 362/208 |
| 2009/0109679 | A1 * | 4/2009 | Ko | F21V 14/02 362/269 |
| 2009/0141495 | A1 * | 6/2009 | Lin | F21V 33/0052 362/253 |
| 2014/0307438 | A1 * | 10/2014 | Pearson | F21V 21/30 362/418 |
| 2016/0238224 | A1 * | 8/2016 | Ostrander | F21V 23/0407 |
| 2016/0327249 | A1 | 11/2016 | Pearson et al. | |
| 2016/0341374 | A1 | 11/2016 | Pearson et al. | |
| 2017/0328577 | A1 * | 11/2017 | Reinhard-Herrscher | E05B 17/10 |
| 2018/0231192 | A1 * | 8/2018 | Bian | F21V 7/22 |
| 2018/0231235 | A1 | 8/2018 | Reynolds | |
| 2018/0347796 | A1 * | 12/2018 | Corbo | F21V 21/06 |
| 2019/0017662 | A1 * | 1/2019 | Zheng | F21L 4/027 |
| 2019/0023363 | A1 * | 1/2019 | Ardoin | F21V 21/26 |
| 2020/0109841 | A1 * | 4/2020 | Cacciabeve | F21V 21/145 |
| 2020/0182442 | A1 * | 6/2020 | Huttenlocher | F21V 21/088 |
| 2020/0256549 | A1 * | 8/2020 | Cacciabeve | F21L 4/08 |
| 2020/0408390 | A1 | 12/2020 | Cacciabeve | |
| 2022/0003423 | A1 * | 1/2022 | Reischmann | F21V 21/26 |
| 2022/0221159 | A1 * | 7/2022 | Reischmann | F24C 15/008 |

\* cited by examiner

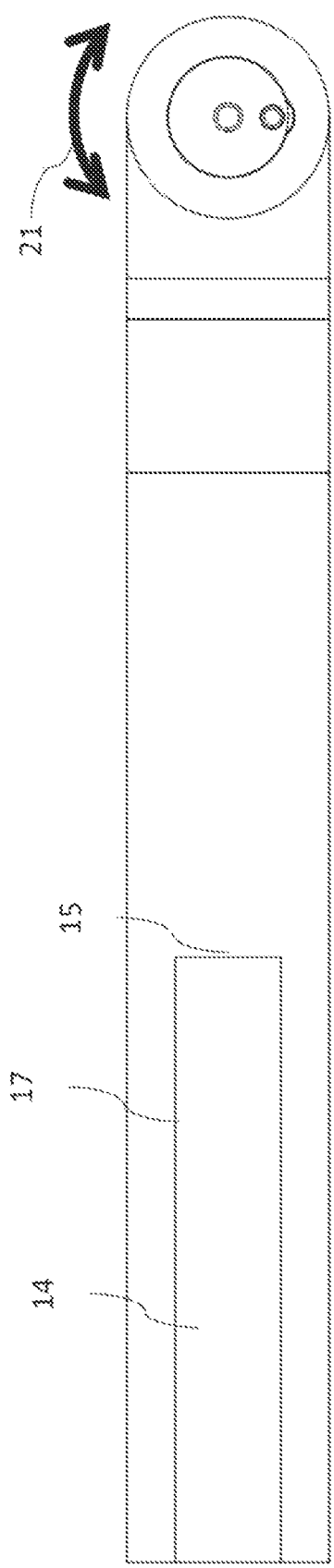

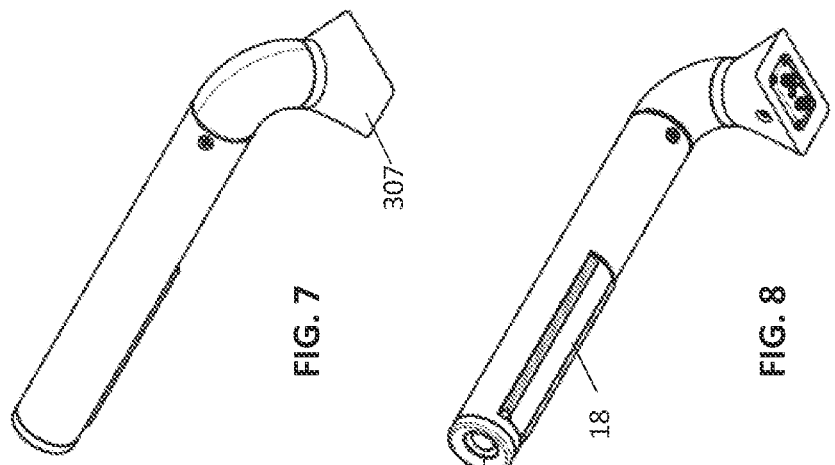
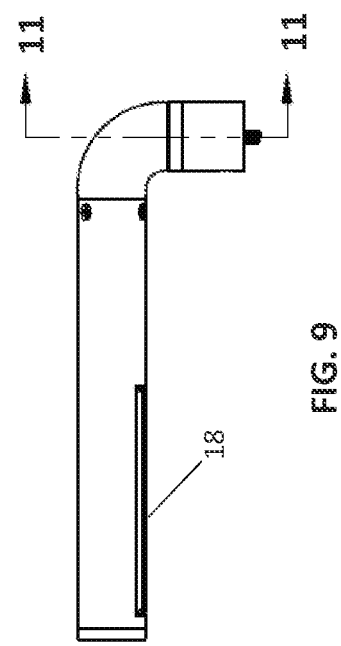
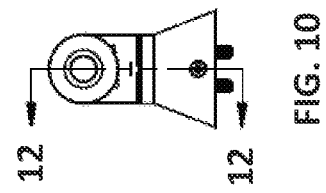

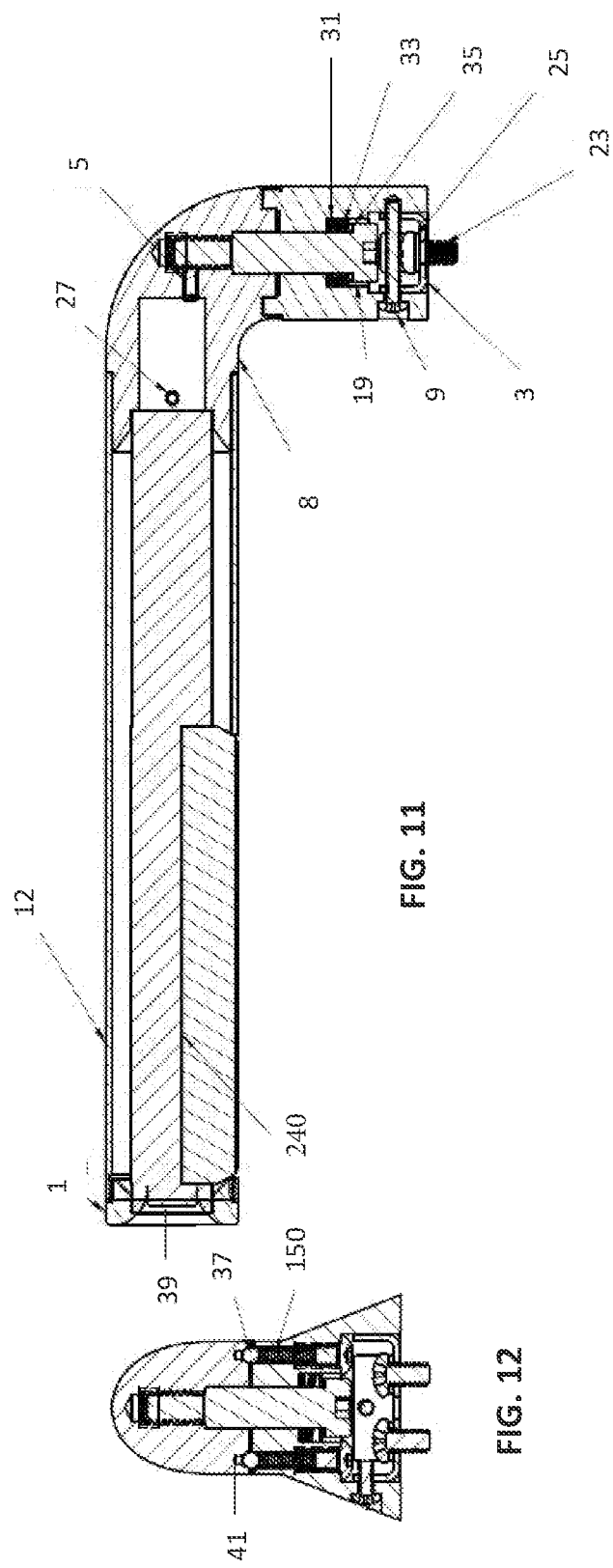

COOKING LIGHT HANDLE

FIELD OF THE INVENTION

The following relates to a cooking light system which is integrated into a handle, and more particularly to a cooking light which it suitable for grills and other cooking element which have lids which may need to be opened or closed and also need lighting so that users can see the food they are cooking.

BACKGROUND OF THE INVENTION

Grilling and outdoor barbeque remain a universally enjoyed pastime in the US and around the world. Grills and barbeques and other outdoor cooking appliances come in many shapes and sizes with a wide variety of cooking fuel options. For example, charcoal grills, gas burning grills, electric grills and wood smokers all widely available and popular to varying degrees. These can be used for cooking food with a wide variety of cooking techniques and many if not all of these appliances come with a lid. Some may be fully removable lids which are pulled off whereas others may be on a hinge which can tilt. Those which can tilt will often have a handle which is insulated with respect to the lid so that the handle remains cool and thus unlikely to burn the user who manipulates the lid to check on the food.

At the same time, these cooking appliances are often located outdoors with limited or marginally acceptable lighting such that the person cooking has a difficult time actually seeing the food they are cooking.

While outdoor lighting on a patio may help in some cases, often the lighting is located such that when the user goes to open the lid they actually block the light from shining on the food, thus failing to solve the problem of the user being able to see the food they are cooking, often times patio or other outdoor lighting is not arranged directly over the grill, thus resulting in shadows cast by the lid or sides of the lid.

SUMMARY OF THE INVENTION

Accordingly, it is an object of the present invention to provide a handle with an integrated light which can be manipulated to shine on a grill or cooking surface to illuminate what is being cooked.

It is a further object of the invention to provide a light source for a cooking surface which is long lasting, weather resistant and provides sufficient lighting power and battery life for long operation.

It is a further object of the invention to provide a cooking light for a cooking surface which can shine light from above the cooking surface unimpeded from obstructions. Preferably, this light will be arranged to project light from above the grill surface such that there are no or minimal obstructions between the light source and the grill surface/food to be illuminated.

These and other objects are achieved by providing a combined grill lid handle and light source which has one or more rotating joints which allow the handle to attach to the lid and be positioned generally horizontal or parallel the grill surface in a storage or handle position and for the handle to be rotated out to be generally perpendicular an edge of the grill lid to which the handle is mounted adjacent to. In the perpendicular position, a light source attached to or preferably mounted in the handle can illuminate the grill surface. When generally parallel/perpendicular/horizontal, it is understood to relate both precisely those orientations and variations to either side which may depend on e.g. manufacturing tolerances, wear from use and the like.

In one aspect a cooking appliance has a cooking surface and a lid which is operable between open and closed positions such that in the closed position the cooking surface is covered by the lid. A handle is attached to the lid at an attachment point and extends to an end of the handle. A light source is attached to the handle and is located between the end of the handle and the attachment point. A joint is located between the light source and the attachment point which allows the handle to move between stored and use positions such that in the use position the light source emits light on the cooking surface from above the cooking surface.

In certain aspects a second joint allows the handle to rotate about an axis transverse to an axis about which the joint rotates. In other aspects an opening in the handle is provided such that the light source is in a housing, particularly the light source inserts into the opening of the housing along the axis of the second joint. In other aspects the handle is hollow and has an opening on a surface of the handle and a housing of the light source inserts into the hollow handle and light is emitted out the opening. In still other aspects a switch is positioned to be activated to turn the light source on and off such that the switch can be activated from the end of the handle. In other aspects the handle rotates about the joint in a plane parallel to a surface of the lid adjacent the attachment point. In still other aspects the joint is selected from the group consisting of: threads, ratchet, friction. In still other aspects the handle includes a tube in which the light source is mounted and the light is removable from the tube. In yet other aspects an elbow joint is positioned between the tube and the attachment point.

In other aspects a handle for a cooking appliance is provided with a hollow tubular element and a light source positioned in the hollow tubular element. The light source is configured to emit light out the hollow tubular element. A support element is connected to the hollow tubular element and is configured to allow the hollow tubular element to rotate about a joint. The support is configured to mount to a grill lid.

In other aspects a switch is positioned at an end of the hollow tubular element such that manipulation of said switch activates the light source.

In other aspects a cooking appliance is provided with a cooking surface and a lid which is operable between open and closed positions such that in the closed position the cooking surface is at least partially covered by the lid. A handle is attached to the lid at an attachment point and the handle has an end spaced from the attachment point. A light source is mounted to the handle and located between the end of the handle and the attachment point. A joint between the light source and the attachment point allows the handle to move between stored and use positions such that in the use position the light source is configured to emit light on the cooking surface from above the cooking surface when the lid is in the open position.

In certain aspects the joint defines an axis about which the light source rotates. In other aspects a second joint allows the handle to rotate about a second axis transverse to the axis about which the handle rotates. In other aspects an opening is in the handle and the light source fits in the opening. In other aspects the light source inserts into the opening along the second axis. In certain aspects the handle is hollow and has an opening on a surface of the handle and the light source inserts into the hollow handle and light is emitted out the opening. In other aspects a switch is positioned to be activated to turn the light source on and off such that the switch can be activated from the end of the handle. In other aspects the joint further comprises at least two stop elements which provide increased resistance to rotation of the handle about the joint in two separate positions corresponding to the stored and use position of the handle wherein the increased resistance to rotation is larger relative to resistance to rotation between the two separate positions. In still other aspects the handle rotates about the joint in a plane parallel to a surface of the lid adjacent the attachment point. In other aspects the joint includes a locking mechanism which holds the handle element in position about an axis of the joint in at least two different positions corresponding to the stored and use positions such that resistance to rotation of the handle element at each of the two positions is greater than resistance to rotation of the handle at one or more positions between the two positions so that a user can apply force to the handle to move between a first of the two positions and a second of the two positions to cause the handle to rotate, wherein in the second of the two positions, the opening is arranged so that light emitted out the opening illuminates the surface and wherein the surface is covered by the lid when the lid is closed. In other aspects handle includes a tube in which the light source is mounted and the light is removable from the tube. In other aspects the joint further includes at least one stop element which provides increased resistance to rotation of the handle about the joint in at least one position wherein the increased resistance to rotation is larger relative to resistance to rotation between at one or more positions other than the at least one position. In still other aspects in the stored position, the handle is generally parallel to the cooking surface.

Still other objects are achieved by providing a handle for an articulating cover. The handle includes a hollow tubular element with a light source positioned in the hollow tubular element. The light source is configured to emit light out an opening of the hollow tubular element. A support element is connected to the hollow tubular element and is configured to allow the hollow tubular element to rotate about a joint. The support element is configured to mount to the articulating cover. In a stored position, the support element can be manipulated to open and close the articulating cover and when in a use position with the articulating cover open, the support element holds the light source such that the light source is configured to illuminate a surface which is covered by the articulating cover when the articulating cover is closed.

In certain aspects a switch is positioned at an end of the hollow tubular element such that manipulation of said switch activates the light source. In other aspects a switch activates the light source when the hollow tubular element is rotated about the joint from stored to use position such that in the use position the light source is activated. In other aspects an end piece is configured to secure to the end of the handle, the end piece including a hole through with a switch is accessible for turning the light source on or off. In other aspects the light source includes an elongated light emitting element whose length is at least 30% of a length of the handle measured between the end and the attachment point. In still other aspects the light source includes an elongated light emitting element whose length is at least 40% of a length of the handle measured between the end and the attachment point. In still other aspects an elongated longitudinal slot in the handle is arranged to allow the light source to emit light out the longitudinal slot. In still other aspects the articulating cover is a lid of a cooking appliance such that the handle is configured to mount to the cooking appliance.

Other objects are achieved by providing a handle for an articulating cover. The handle includes a hollow tubular element configured to have a light source mounted thereto and wherein the hollow tubular element includes an opening through which light from the light source is configured to exit to illuminate a surface. A support element is connected to the hollow tubular element and is configured to allow the hollow tubular element to rotate about a joint. The support is configured to mount to the articulating cover and the joint comprises a locking mechanism which holds the hollow tubular element in position about an axis of the joint in at least two different positions such that resistance to rotation of the hollow tubular element at each of the two positions is greater than resistance to rotation of the hollow tubular element at one or more positions between the two positions so that a user can apply force to the hollow tubular element to move between a first of the two positions and a second of the two positions to cause the hollow tubular element to rotate. In the second of the two positions, the opening is arranged so that light emitted out the opening illuminates the surface and the surface is covered by the articulating cover when the articulating cover is closed.

Other objects of the invention and its particular features and advantages will become more apparent from consideration of the following drawings and accompanying detailed description.

BRIEF DESCRIPTION OF THE DRAWINGS

FIG. 3 is a bottom view of the handle of FIG. 1

FIG. 7 is a perspective view of the handle of FIG. 1 with a different mount to the grill lid.

FIG. 8 is a bottom perspective view of the handle of FIG. 7.

FIG. 9 is a side view of FIG. 7 showing section line 11-11.

FIG. 10 is an end view of FIG. 7 showing section line 12-12.

FIG. 11 is a cross section along line 11-11.

FIG. 12 is a cross section along line 12-12.

DETAILED DESCRIPTION OF THE INVENTION

Figure 1:
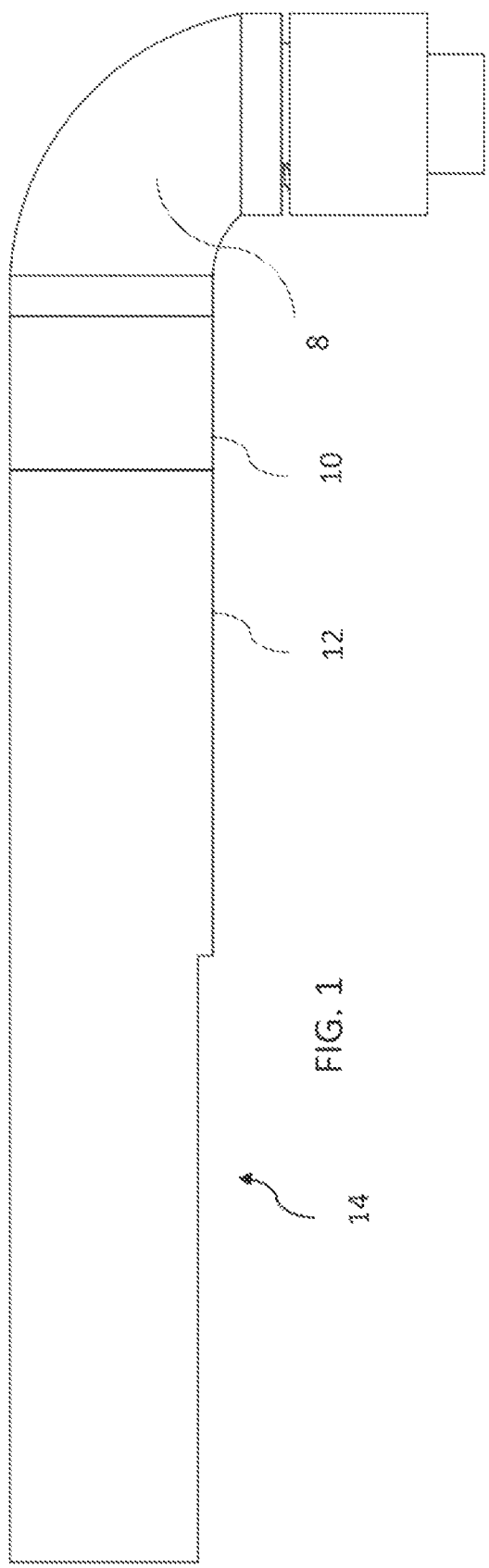
FIG. 1 is a side view of the handle according to the present invention.

Referring now to the drawings, wherein like reference numerals designate corresponding structure throughout the views. The following examples are presented to further illustrate and explain the present invention and should not be taken as limiting in any regard.

Figure 2:
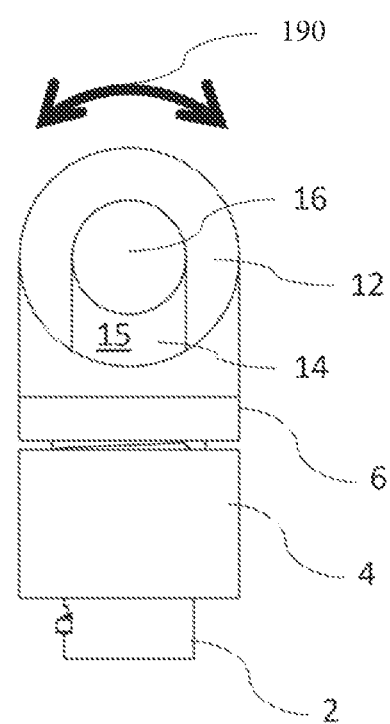
FIG. 2 is an end view of the handle of FIG. 1

Referring to FIGS. 1-3, the handle is shown with a narrowed portion 2 which fits through a hole in the grill lid and extension 4 which is of a larger diameter than portion 2. This extension 4 in some embodiments is internally threaded and piece 6 includes a male threaded portion which engages extension 4. In other embodiments, the attachment between piece 4 and 6 is a ratchet system similar to ratcheting wrenches. Friction couplings and friction locks can also be used. In this manner, the handle can be rotated 21 but will stay in the desired position to which it is rotated. Further detail of one exemplary locking/rotation mechanism is depicted in FIGS. 7-12.

Curved connector/elbow 8 provides for a 90 degree angle between portion 4 and extension tube/housing 12. This angle may vary depending on how the grill lid is configured in that when the grill lid is opened, the extension tube 12 should generally be horizontal when rotated 21 to extend towards the user with the hollow end 16 of the tube facing outwards (See FIG. 6). The axis of rotation of the handle can be adjusted so that if, e.g. the angle of the attachment point of the lid surface relative to the grill surface is not parallel that the joint rotation can be offset so that the handle is generally parallel the attachment point's surrounding surface and so that when the lid is open the handle is generally parallel to the cooking surface. This ensures that the light shines directly down on the grill/cooking surface. Generally therefore, in the use position the handle's longitudinal axis will be perpendicular to the hinge axis for the lid—the hinge axis being the axis about which the lid rotates which is generally shown where the grill and lid meet in FIG. 6. It is also contemplated that the lens of the light source can be adjusted/calibrated to direct light to cover the cooking surface and to account for lid shapes and configurations/orientations in the open position relative to the cooking surface.

Section 10 connects the piece 6 with the male threaded portion to the extension tube. This extension tube has a cutout 14 with edges 17 and 15 sized to receive a light therein. The location of edge 15 and the length of the extension tube 12 and section 10 is designed such that the light path or cone the light creates is not interfered with by the grill lid. Specifically, the center of the hole in which the narrowed portion 2 is mounted in a hole which is spaced apart from the bottom edge of the grill lid at a given distance. The light cone will extend generally in an outwardly tapered direction from edge 15 towards narrowed portion 2. Given the height of the light source over the outside of the grill edge and the location of the mounting hole for the handle, the edge can be located to hold the light far enough away from the bottom edge of the grill lid so that the light cone is not interfered with in the orientation shown at FIG. 6.

As can be seen extension tube 12 is hollow 16. Furthermore, piece 10 can also be a screw/ratchet or other rotation system to allow rotation similar to rotation 21 but in this case the handle would twist 190. This twisting action can be used to direct the light left to right on the grill. Thus, the handle can rotate 190/21 about two axes. This allows the handle to be positioned to move up/down to open/close the lid and then once open, the handle can be positioned to extend outwardly so that the opening 14 points downwards. Then, the handle can be manipulated to direct the light cone left or right or centered to illuminate the desired area. Preferably, the light cone is large enough to illuminate the entire surface of the grill without need for the left to right rotation.

Figure 5:
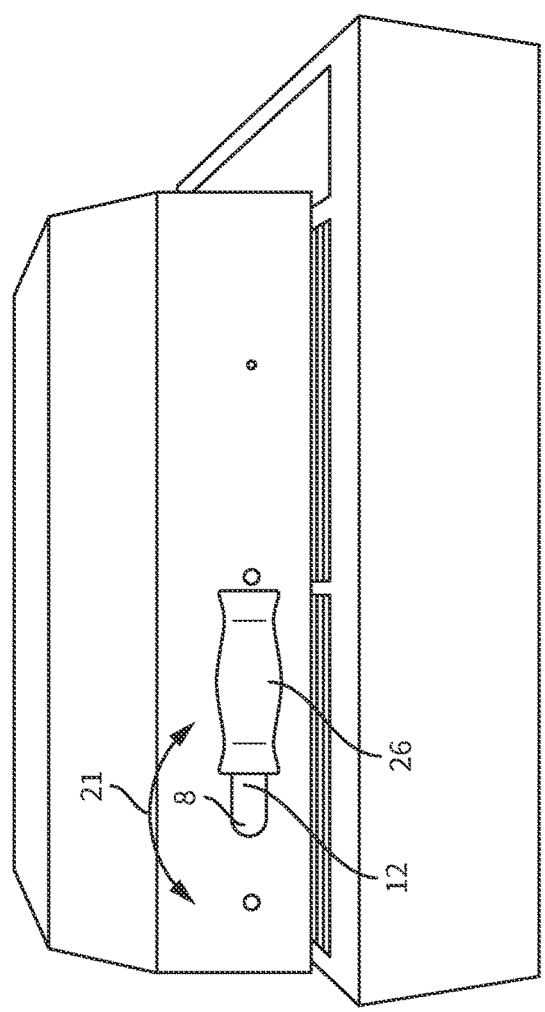
FIG. 5 shows the handle of FIG. 1 installed on a grill.
Figure 4B:
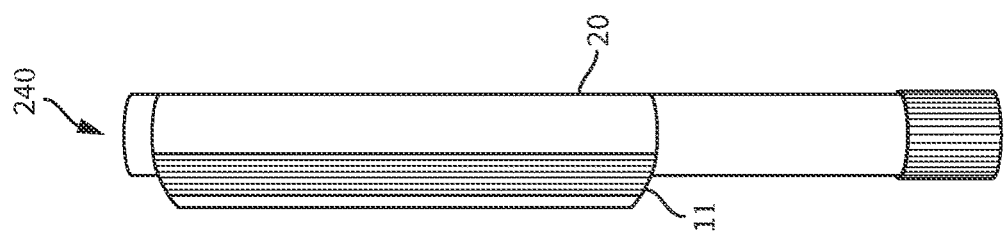
FIG. 4B is a side view of the light of FIG. 4A.
Figure 4A:
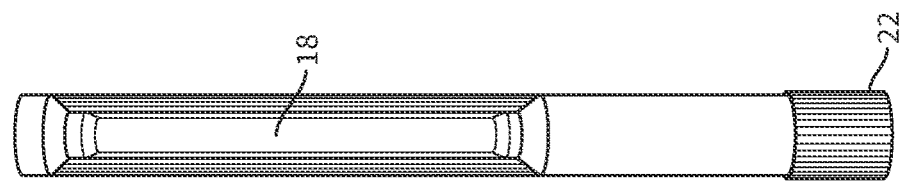
FIG. 4A is a bottom view of the light which fits into the handle of FIG. 1.

FIG. 4A-B shows the light which inserts into hollow end 16 where the lens can emit light out opening 14. The light lens 18 is an amplifying reflector lens with a series of LED lights behind it. The body/housing 20 of the light is cylindrical and hollow and can receive standard sized batteries such as AA or AAA batteries. End 22 screws on/off in order to replace batteries as needed. At the opposite end, button 39 is used to turn the light on/off. The light lens 18 and LEDs are mounted in boss 11 which extends from the body and as shown is generally rectilinear in shape or includes at least two parallel sides which fit within edges 17. The base of the boss 11 (where lead line for boss 11 ends) will abut edge 15 to limit insertion of the light. The light may be provided with a voltage amplifier circuit to increase the voltage supplied by the batteries to the LED. Optionally, the end 16 of the extension tube 12 may include threads or another attachment system to place a retaining piece on the end to inhibit the light from falling out. As shown in FIG. 5, the handle is installed on the grill and decorative wrap 26 is added to the handle. The decorative wrap may be leather, wood, ceramic, plastics or other materials. The extension tube 12 may be made of a material both decorative and structural such as stainless steel, carbon fiber and others. The button 39 in this case would be accessible by someone taking their left hand to hold the handle and pressing the button with their thumb to activate the light.

In certain cases, the handle is provided to be easily removable and replaceable with differently decorated handles. In some cases, the light is not provided in the handle and the cutout 14 is also not provided. In this case, the handle as shown is a single point mount which can rotate for e.g. left or right hand operation. The handle may also be provided to rotate into position and then be locked there. The single point mount allows the handle mounting position to be easily varied among different size/shape grills and with different orientations of the handle.

Optionally the end 22 diameter and body 20 diameter are the same and are sized to match or be slightly smaller than the inner diameter of the extension tube 12 so that the light is insertable and held securely in the extension tube 12. The end 22 may include a magnet and the inside of the handle may include a magnetic receptive material that the magnet in end 22 holds to with magnetic force.

Figure 6:
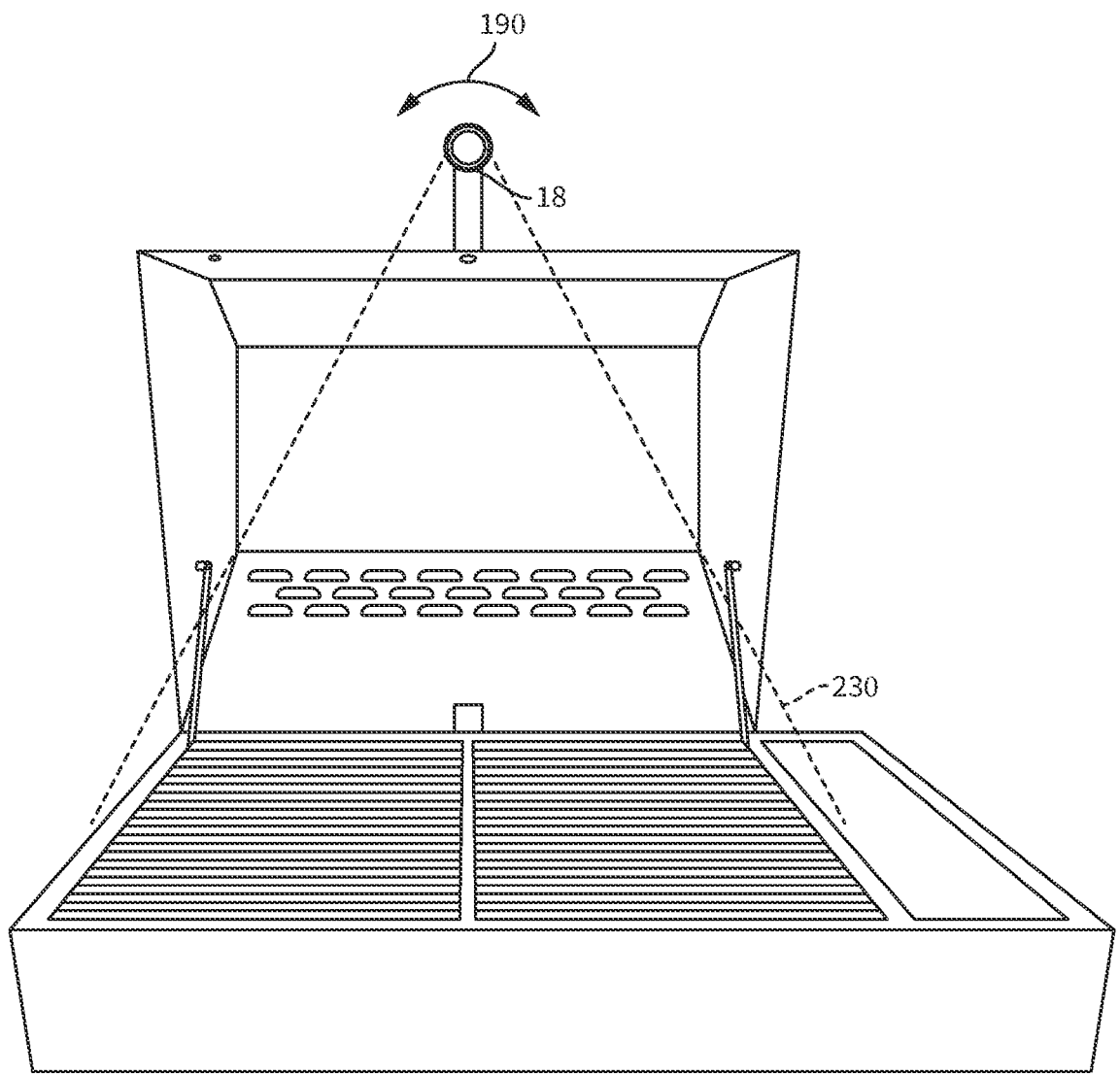
FIG. 6 shows the handle and light of FIG. 5 in operation.

Once the handle has been used to open the grill lid as shown in FIG. 6 (or as that opening occurs), the handle can be rotated 21 so that the button 39 is generally facing the user. The handle can then be twisted 190 to change the position of the light cone 230 relative to the grill surface in generally the left and right directions. Preferably, the light pointing straight down provides a light cone which captures the entire grill surface. Optionally, the light can be twisted 190 to illuminate the controls for the grill. The light cone 230 may also be wide enough to illuminate the grill surface and controls which are outside the grill surface. It is understood that this handle can be utilized in other cooking appliances or situations where lids are manipulated by handles and then also could benefit from illumination such cooktops, storage boxes and other lid covered items, particularly those designed to be kept outside.

FIGS. 7-11 show additional detail concerning the construction of the handle. Particularly, the handle may include a decorative base 307 which attaches to the grill lid with two screws 23 which include lock washers 25 to inhibit the handle and lid connection from becoming loose over time. A bracket 3 mounts in this decorative base 307 and a screw 9 connects this bracket 3 to the decorative base 307. As shown, the bracket is generally a U shaped channel with two holes for screws 23 and holes for screw 9. A screw 19 with a shoulder shown at the lower end near the screw head is positioned in the base 307 and connects to the elbow 8 to provide the rotating joint about the axis of the screw. As shown in FIG. 12, on either sides of screw 19 and spaced from the screw/rotation axis of the handle are springs 150 which press against ball bearings 37. These ball bearings can move up and down into and out of detents 41 which are placed normally to create resistance in the stored (FIG. 5) and the activated/use (FIG. 6) positions. In this way, when the detents are reached, the balls 37 enter the detents and provide resistance against rotation about the axis of screw 19. This provides stops for the handle in two positions, stored and use (grill surface is illuminated). The resistance to rotation between detent(s) is less relative to the resistance to rotation with detent (s) engaged. Specifically, a race may be provided for the ball bearing to move relatively smoothly between stored and use positions but the detent is at a level spaced from the race along the rotation axis of the handle and the springs 150 will move the ball into the detent and thus increase the rotation resistance. It is understood that "activated" or "use" positions of the handle refers to those intended for the light to be useful in illuminating the grill/cooking surface and that in the "stored" position, the handle is still useful to open/close the grill lid. Generally, the stored position will be roughly parallel to the grill surface when the lid is closed and the activated or use position of the handle is preferably at 90 degrees to the stored position or 90 degrees to the bottom edge of the lid to a plane defined by the bottom edge of the lid.

Screw 19 includes washers 35/31—typically nylon but other materials are contemplated. Spring 33 is provided to allow the elbow to move slightly axially to accommodate the balls 37 moving into and out of the detents 41. In this way when the handle is in the stored position FIG. 5, there will be adequate resistance that if the user pulls up on the handle to open the lid, the handle will not rotate. If the user pushes down on the handle to close the lid, the handle will also not rotate. However, if the user wants to rotate the handle, they can do so by e.g. applying force to housing 12 to enable the balls 37 to be forced out of the detents and into a channel, thus releasing the pressure keeping the handle from rotating. Then, the user rotates until the set of detents aligned with the use/activated position (FIG. 6) engage the balls 37, thereby holding the handle so that the end of the handle is generally facing outwards towards the user (FIG. 6). This action also helps to keep the light in a steady position when in use for viewing food on the grill. FIG. 11 also shows a set screw 5 which engages screw 19 to inhibit/prevent the screw 19 from coming undone from the threading in elbow 8. As can be seen, the set screw 5 can be accessed through the housing 12 when the light 240 is removed e.g. by unscrewing the end cap 1. Alternately, this screw 19 can be accessed by removing screw 27 and allowing the housing 12 to be removed from the elbow 8. The switch (shown as a push button) is accessible via a hole in the end cap 1 thereby providing for a smooth rotation operation of the handle from stored position (FIG. 5) to the lighted position (FIG. 6). A ball 37 and detent 41 may include electrical contacts which close a circuit when the ball is in the detent by touching the spaced contacts. This can operate as a switch to turn the light source on when the handle is in the use position.

As can be seen the spacing between the edge 15 of the light source opening closest to the attachment point and the axis defined by screw 19 is located so that when the handle moves to the use position that the edge 15 hangs out over the grill surface beyond the bottom edge of the grill lid. This is also dependent on the location of the attachment point relative to the bottom edge of the grill lid. Preferably, the spacing is such that the light cone 230 does not hit the grill lid. Particularly, the distance measured It is noted that the light cone in FIG. 6 is shown side to side but that it is understood that the light cone also has a fore/aft component whose angle and projection pattern depends on the light source and lens configuration used therein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A handle for an articulating cover comprising:
   a hollow tubular element elongated along an axis;
   a light source positioned in said hollow tubular element and the light source is configured to emit light out an elongated opening of the hollow tubular element;
   a support element connected to said hollow tubular element and configured to allow said hollow tubular element to rotate about a joint and said support element configured to mount to the articulating cover wherein when in a stored position, the support element can be manipulated to open and close the articulating cover and when in a use position with the articulating cover open, the support element holds the light source such that the light source is configured to illuminate a surface which is covered by the articulating cover when the articulating cover is closed;
   wherein the handle includes a passage through which the light source is accessible to be turned on and/or off.

2. The device of claim 1 further wherein the joint defines an axis about which the light source rotates.

3. The device of claim 2 further comprising:
   a second joint which allows the handle to rotate about a second axis transverse to the axis about which the handle rotates.

4. The device of claim 2 further comprising an opening in the handle and the light source fits in the opening and the light source inserts into and is removable from the opening along a second axis transverse to the axis about which the handle rotates.

5. The device of claim 1 wherein a magnet holds the light source inside said hollow tubular element.

6. The device of claim 5 wherein the magnet is positioned at an end of the light source and the handle includes a magnetic receptive material positioned such that when the end is inserted into the handle, the magnet and the magnetic receptive material hold the light source inside said hollow tubular element.

7. The device of claim 6 further comprising an end part which threads into an end of the hollow tubular element, the end of the hollow tubular element positioned adjacent a second end of the light source.

8. The device of claim 1 wherein the light source further comprises an elongated light emitting element which includes an amplifying reflector lens.

9. The device of claim 1 further comprising an end cap which threads into an end of the hollow tubular element to restrict movement of the light source out of the hollow tubular element.

10. The device of claim 9 wherein the passage is located in the end cap.

11. A handle for an articulating cover comprising:
   a hollow tubular element elongated along an axis;
   a light source positioned in said hollow tubular element and configured to emit light out an opening of the hollow tubular element, wherein said opening is elongated;
   a support element connected to said hollow tubular element and configured to allow said hollow tubular element to rotate about a joint and said support element configured to mount to the articulating cover wherein when in a stored position, the support element can be manipulated to open and close the articulating cover and when in a use position with the articulating cover open, the support element holds the light source such that the light source is configured to illuminate a surface which is covered by the articulating cover when the articulating cover is closed;

wherein the light source includes an elongated light emitting element which includes an elongated amplifying reflector lens.

12. The device of claim 11 further comprising an end cap which threads into an end of the hollow tubular element to restrict movement of the light source out of the hollow tubular element.

13. The device of claim 11 wherein the end cap includes a passage through which the light source is accessible to be turned on and/or off.

14. The device of claim 11 wherein a magnet holds the light source inside said hollow tubular element.

15. The device of claim 14 wherein the magnet is positioned at an end of the light source and the handle includes a magnetic receptive material positioned such that when the end is inserted into the handle, the magnet and the magnetic receptive material hold the light source inside said hollow tubular element.

16. A cooking appliance comprising:

a cooking surface;

a lid which is operable between open and closed positions such that in the closed position the cooking surface is at least partially covered by the lid;

a handle attached to the lid at an attachment point and the handle having an end spaced from the attachment point;

a light source mounted to the handle and located between the end of the handle and the attachment point wherein the light source includes an elongated light emitting element which includes an amplifying reflector lens;

a joint located between the light source and the attachment point and the joint allows the handle to move between stored and use positions such that in the use position the light source is configured to emit light on the cooking surface from above the cooking surface when the lid is in the open position.

17. The device of claim 16 further comprising: a locking mechanism which holds said handle element in position about an axis of the joint in at least two different positions corresponding to the stored and use positions such that resistance to rotation of the handle element at each of the two positions is greater than resistance to rotation of the handle at one or more positions between the two positions so that a user can apply force to the handle to move between a first of the two positions and a second of the two positions to cause the handle to rotate, wherein in the second of the two positions, the opening is arranged so that light emitted out the opening illuminates the surface and wherein the surface is covered by the lid when the lid is closed.

18. The device of claim 16 further wherein the joint defines an axis about which the light source rotates.

19. The device of claim 18 further comprising:

a second joint which allows the handle to rotate about a second axis transverse to the axis about which the handle rotates.

20. The device of claim 18 further comprising an opening in the handle and the light source fits in the opening and the light source inserts into and is removable from the opening along a second axis transverse to the axis about which the handle rotates.

\* \* \* \* \*